United States Patent
Hamilton, II et al.

(10) Patent No.: US 7,516,013 B1
(45) Date of Patent: Apr. 7, 2009

(54) METHOD FOR GATHERING MOBILE CONSUMER-INITIATED BUSINESS SERVICE LOOK-UP REQUESTS

(75) Inventors: Rick A. Hamilton, II, Charlottesville, VA (US); Steven A. Steigmeyer, Dripping Springs, TX (US); Brian M. O'Connel, Cary, NC (US); Keith R. Walker, Austin, TX (US); Steven V. Jackson, Yardley, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/142,874

(22) Filed: Jun. 20, 2008

(51) Int. Cl.
*G06F 7/08* (2006.01)
(52) U.S. Cl. ................... 701/213; 707/201
(58) Field of Classification Search .......... 701/200, 701/207, 213; 455/456.1, 456.3; 705/26, 705/15, 10, 7, 17; 707/7, 201, E17.046, E17.089, 707/E17.109, E17.001, E17.059, E17.107, 707/E17.108, E17.111, 10; 709/206; 342/357.12, 342/357.13
See application file for complete search history.

(56) References Cited

U.S. PATENT DOCUMENTS

| 6,336,073 | B1 | 1/2002 | Ihara et al. |
| 6,850,988 | B1 * | 2/2005 | Reed ................. 709/238 |
| 7,096,030 | B2 | 8/2006 | Huomo |
| 7,149,732 | B2 * | 12/2006 | Wen et al. ............. 707/4 |
| 7,233,862 | B2 | 6/2007 | Endo et al. |
| 2005/0046548 | A1 * | 3/2005 | Foster et al. ......... 340/286.09 |

* cited by examiner

*Primary Examiner*—Dalena Tran
(74) *Attorney, Agent, or Firm*—Locke Lord Bissell and Lidell LLP

(57) ABSTRACT

A method for receiving consumer-initiated business service look-up requests entered into a GPS unit, along with the corresponding geographic location the request was entered. These requests are received at a Central Processing Station whereupon the data is analyzed to identify concentrations of similar requests within a geographic region.

1 Claim, 3 Drawing Sheets

METHOD FOR GATHERING MOBILE CONSUMER-INITIATED BUSINESS SERVICE LOOK-UP REQUESTS

FIELD

The description relates to the field of automated data gathering for purposes of identifying consumer market demands by demographics within a geographic area.

BACKGROUND

Business development groups currently use a multitude of indirect data such as population density and other demographics to evaluate business opportunities in geographic locations. However, the use of indirect data to evaluate business opportunities often proves insufficient. Furthermore, attempts to obtain direct data often prove difficult. For example, it is often very difficult to obtain direct data (through the use of surveys, etc) from transient people who meander through certain geographic locations. Surveys are often intrusive and people don't have the time to participate in them. This lack of direct data, coupled with the unreliability of indirect data often causes business establishments to be developed in regions that are unable to support those businesses. This leads to business failure. Accordingly, what is needed is a method of collecting direct data including consumer requests for goods and services in particular geographic regions automatically without requiring intrusive surveys and burden to the target population.

SUMMARY

The present disclosure resolves the foregoing problem by providing a system and method for receiving consumer-initiated business service look-up requests entered into a GPS unit, along with the corresponding geographic location where the user made the request and the time the request was made. In the disclosed method, requests entered into a user's GPS are transmitted to a receiver at a Central Processing Station whereupon the data is analyzed to identify concentrations of similar requests within a geographic region. This information may be used at the Central Processing Station to determine business location strategy, to determine where advertisements may be placed or hours during which consumers are looking for the business services. Such information is also highly valuable to business development groups, which could leverage such data to accurately predict sales volumes. Accordingly, using the disclosed method provides accurate data describing consumer requests for business types along with the location requested that can be used to evaluate business opportunities.

In accordance with at least one disclosed example, a method for gathering mobile consumer-initiated business service look-up requests comprises: receiving, at a Central Processing Station, a business service look-up request entered into a GPS unit by a GPS user, wherein the business service look-up request includes at least one of a point-of-interest request or business name request, and wherein information corresponding to the request is stored in a memory within the GPS unit before being transmitted to the Central Processing Station over a Wi-Fi, cellular or mobile device network; receiving, at the Central Processing Station, request entry location information, wherein the location information corresponds to the GPS user's geographic location at the time the GPS user entered a business service look-up request in the GPS unit and wherein the location information is stored in a memory within the GPS unit before being transmitted to the Central Processing Station over a Wi-Fi, cellular or mobile device network; confirming receipt of the business service look-up request and request entry location information at the Central Processing Station; repeating the receiving and confirming steps for a plurality of GPS units; storing the information received from the plurality of the GPS units in a relational database stored in a Central Processing Station memory; and analyzing the information received to identify concentrations of similar business service look-up requests within a geographic region.

DETAILED DESCRIPTION

Global Positioning System (GPS) is the only fully functional Global Navigation Satellite System (GNSS). Utilizing a constellation of at least 24 Medium Earth Orbit satellites that transmit precise microwave signals, the system enables a GPS receiver to determine its location, speed, direction, and time.

GPS receivers have found wide commercial use in vehicle navigation systems. Today these systems are offered as a standard option in nearly every new automobile. Portable navigation systems are also available from many manufacturers. In general, GPS receivers are composed of an antenna tuned to satellite transmission frequencies, a receiver, a processor and a highly-stable clock (often a crystal oscillator). They may also include a display for providing location and speed information to the user.

GPS Receiver's designed for automobile travel enable the user to route from the current location to a destination location. Most systems today also permit users to locate points of interest (POIs), such as gas stations, restaurants, shopping centers, through the system's user interface. Commonly, a user will interact with the GPS user interface and request a specific point of interest, such as a fast food restaurant, near their current location.

Figure 1:
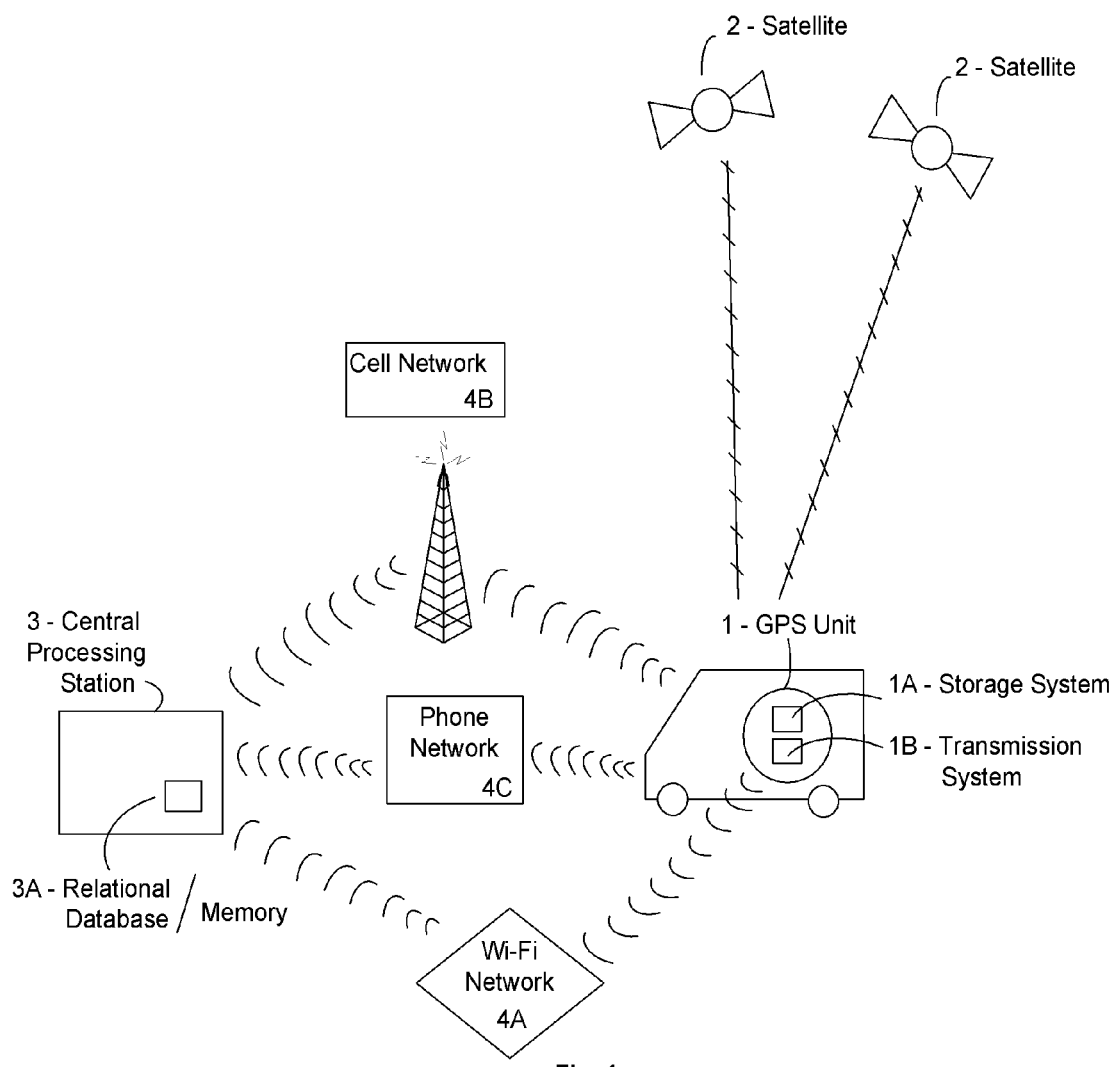
FIG. 1 is a diagram illustrating an exemplary system of one possible embodiment.

As illustrated in FIG. 1, a system of one possible embodiment for gathering consumer data may include the following components: A GPS unit 1 residing in a user vehicle, satellites 2, a Central Processing Station 3, and access to a network 4 via a transmission system. The GPS unit 1 includes storage 1A and transmission system 1B (e.g., Wi-Fi, cellular or mobile device connection). The Central Processing Station 3 also includes a relational database/memory 3A.

The GPS unit 1 in one embodiment is augmented through modifications to the input system and the addition of storage 1A and transmission subsystems 1B. The input system may be modified to capture user business service look-up requests. For example, requests may be entered by a user into GPS unit 1 using any known means including via touch-screen, keyboard or wireless input from a cell phone or PDA. Two distinct types of requests that may be captured are point of interest and business name requests.

A point of interest (POI) request occurs when a user selects a business type from a GPS user interface. Business types may include, but are not limited to restaurants (often categorized by cuisine), fuel stations, airports or shopping malls. When a user requests a point of interest, the GPS unit 1 displays matching points of interest, usually in order of those closest to those farthest away, enabling the user to select and navigate to a specific business. Upon selection, the GPS routes the user to the selected destination.

A business name request occurs when a user inputs all or part of a business name into a GPS user interface. Business names may be a restaurant name, fuel station name, or other business name. In standard operation, when a user enters a name the GPS unit 1 displays the closest matching names, usually in order of those closest to those farthest away, enabling the user to select and navigate to a specific business. Upon selection, the GPS routes the user to the selected destination.

Figure 2:
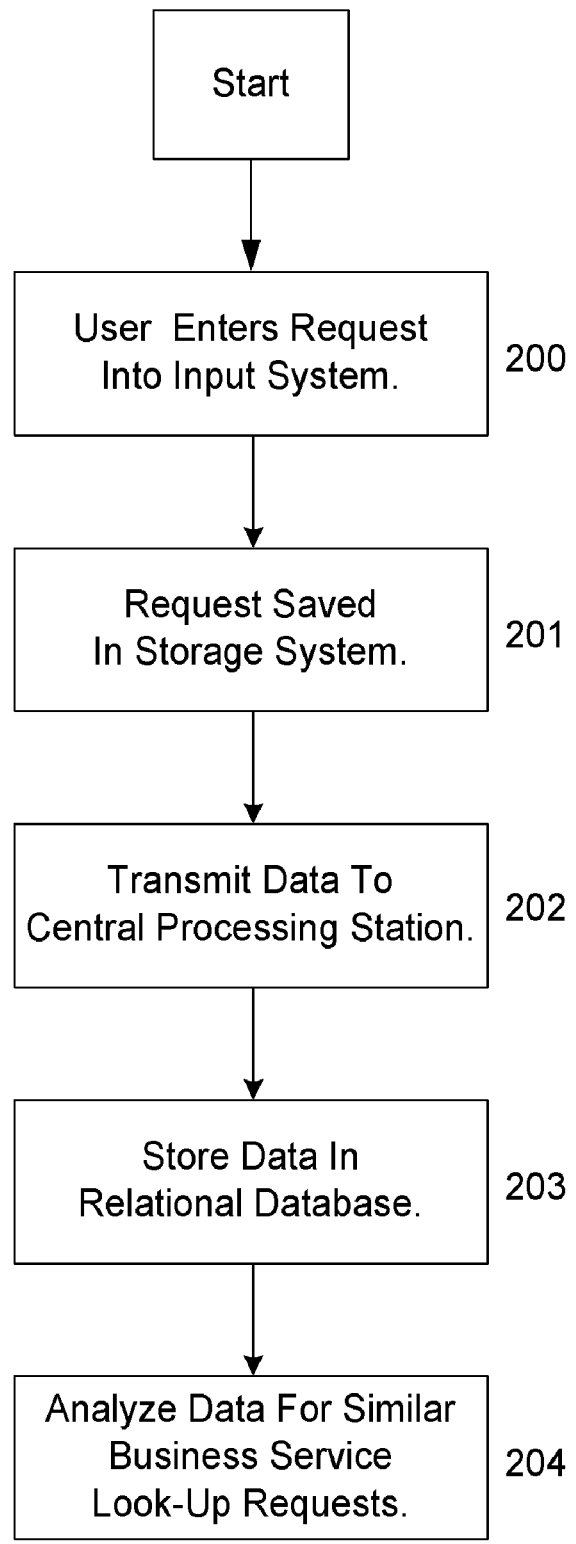
FIG. 2 is a flow-chart illustrating an exemplary manner for automatically gathering consumer data using the system of FIG. 1.

As depicted in FIG. 2, at step 200 a user enters a request into the GPS unit 1. Upon entering the request, the system records at least the requested business name or type, the location of the GPS unit, as well as the time of the request. The system may also record other data including the direction of travel, the user's ultimate destination and the business selected by the user from the POI search results that are displayed. Next, at step 201, this data is stored in the GPS storage system 1A (described below) in case transmission is impossible due to poor network coverage, service outages or other reasons. At step 202, upon connecting to a communication network, the transmission system 1B transmits the data, including the request entry location (the GPS user's geographic location at the time the GPS user entered the request) to the Central Processing Station 3 (described below).

Figure 3:
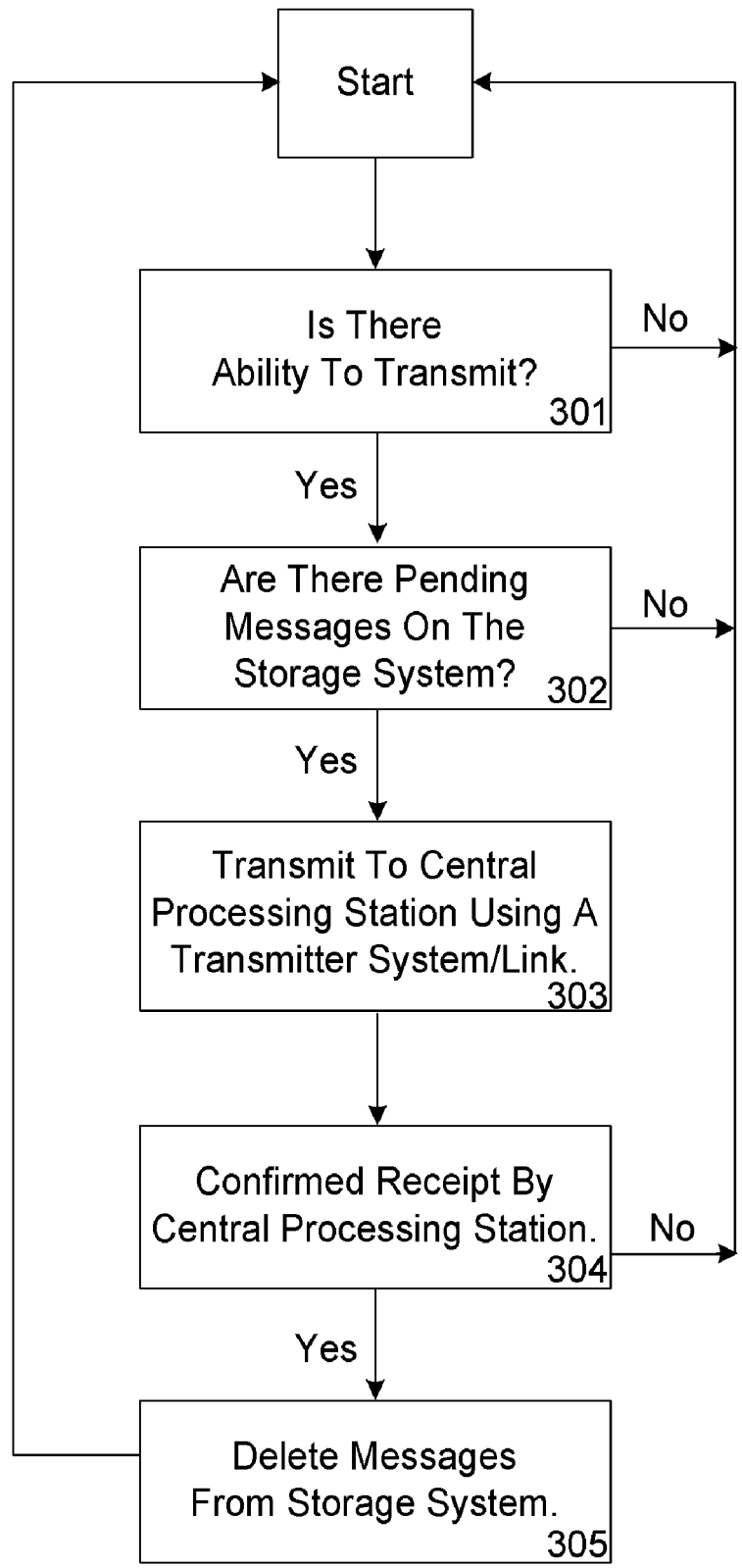
FIG. 3 is a flow-chart illustrating an exemplary process used to transmit data to the Central Processing Station.

The transmission system 1B may connect to any network by any known means including Wi-Fi, cell or other wired or wireless networks. Known techniques, such as SSL certificates, may be employed to enforce security and verify integrity of transmissions. After this input is received, the Central Processing Station 3 confirms receipt of the input. For example, in one embodiment, the GPS unit 1 includes a Wi-Fi transmission system 1B. As depicted in FIG. 3, at step 301 the system checks to see if a Wi-Fi base station is within transmission range. If so, at step 302 the system checks for pending messages on the storage system. If pending messages exist, at step 303 those messages are transmitted to a Central Processing Station 3 (described below) over the Wi-Fi network 4A. After each successful transmission, at step 304 the Central Processing Station confirms receipt of the transmission and the pending messages are deleted from the storage system 1A (described below) at step 305.

In another embodiment, the GPS unit 1 includes a cellular network transmission system 1B. As depicted FIG. 3, at step 301 the system checks to see if a cellular network base station is within transmission range. If so, at step 302 the cellular network system checks for pending messages on the storage system. If pending messages exist, at step 303 those messages are transmitted to a Central Processing Station 3 (described below) over the cellular network 4B. After each successful transmission, at step 304 the Central Processing Station confirms receipt of the transmission and the pending messages are deleted from the storage system 1A (described below) at step 305.

In yet another embodiment, the GPS unit 1 includes a transmission system 1B link to a mobile networked device, such as a cell phone. As depicted FIG. 3, at step 301 the system checks to see if the mobile network device may transmit data. If so, at step 302 the device linking system checks for pending messages on the storage system. If pending messages exist, at step 303 those messages are transmitted to a Central Processing Station 3 (described below) through the mobile device over the network 4C. After each successful transmission, at step 304 the Central Processing Station confirms receipt of the transmission and the pending messages are deleted from the storage system 1A (described below) at step 305.

The storage system 1A, which is incorporated into the GPS unit 1, stores information until such a time that the transmission system 1B may transmit information to the Central Processing Station 3. The information is maintained in the storage system 1A until the Central Processing Station 3 confirms receipt of the information, whereupon the information is deleted from the storage system 1A.

The Central Processing Station 3 receives input transmissions (business-service lookup requests, request location information, request time, user destination and user's POI selection) from a GPS unit 1 through one of the previously described transmission systems 1B. These transmissions are received from a plurality of GPS units 1. After receiving the transmission, the Central Processing Station 3 confirms receipt of the information and, at step 203 in FIG. 2, creates a record for each lookup request including the corresponding request entry location information and other data in a relational database 3A. The relational database permits the records to be inserted, queried and consolidated. At step 204, the data may be analyzed to identify concentrations of similar business service look-up requests within a geographic region, business requests by time of request, direction of travel or ultimate POI choice. For example, if many look-up requests are entered for McDonalds at 2:00 a.m. in a certain geographic area, but only Burger King is open at 2:00 a.m., these people may opt to eat at a Burger King restaurant instead. McDonalds could utilize this information to prevent loss of business to their rival and better service their existing as well as their prospective clientele by extending their operating hours. This information may also be utilized by businesses to generate more lucrative sales projects and more accurately detect potential business opportunities. Business developers may also pay for access to the consolidated and analyzed information to verify, determine or affirm where to build new businesses or franchises. In these way, among others, the described method may have enormous business value.

Although specific example embodiments have been disclosed, a person skilled in the art will understand that changes can be made to the specific example embodiments without departing from the spirit and scope of the invention.

What is claimed is:

1. A method for gathering mobile consumer-initiated business service look-up requests comprising:

receiving, at a Central Processing Station, a business service look-up request entered into a GPS unit by a GPS user, wherein the business service look-up request includes at least one of a point-of-interest request or business name request, and wherein information corresponding to the request is stored in a memory within the GPS unit before being transmitted to the Central Processing Station over a Wi-Fi, cellular or mobile device network;

receiving, at the Central Processing Station, request entry location information, wherein the location information corresponds to the GPS user's geographic location at the time the GPS user entered a business service look-up request in the GPS unit and wherein the location information is stored in a memory within the GPS unit before being transmitted to the Central Processing Station over a Wi-Fi, cellular or mobile device network;

confirming a successful transmission receipt and deleting pending message from storage system of the business service look-up request and request entry location information at the Central Processing Station;

repeating the receiving and confirming steps for a plurality of GPS units;

storing the information received from the plurality of the GPS units in a relational database stored in a Central Processing Station memory; and analyzing the information received to identify concentrations of similar business service look-up requests within a geographic region.

* * * * *